United States Patent
Mehaffey (10) Patent No.: US 8,144,009 B2
(45) Date of Patent: *Mar. 27, 2012

(54) REMOTE MONITOR SYSTEM WITH RADIO DISPATCH

(75) Inventor: Joseph Sutton Mehaffey, Kennesaw, GA (US)

(73) Assignee: Lookout Portable Security, Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/086,264

(22) Filed: Apr. 13, 2011

(65) Prior Publication Data

US 2011/0189941 A1   Aug. 4, 2011

Related U.S. Application Data

(63) Continuation of application No. 12/491,869, filed on Jun. 25, 2009, now Pat. No. 7,936,263.

(51) Int. Cl.
*G08B 1/08* (2006.01)
(52) U.S. Cl. .......................... 340/539.18; 340/539.16
(58) Field of Classification Search ............ 340/539.18, 340/539.16, 505; 379/37; 455/404.1, 521
See application file for complete search history.

(56) References Cited

U.S. PATENT DOCUMENTS

| | | | |
|---|---|---|---|
| 2,364,357 A | 12/1944 | Halstead | |
| 4,868,859 A | 9/1989 | Sheffer | |
| 5,278,539 A | 1/1994 | Lauterbach et al. | |
| 5,283,549 A | 2/1994 | Mehaffey et al. | |
| 5,568,535 A | 10/1996 | Sheffer et al. | |
| 5,745,849 A | 4/1998 | Britton | |
| 5,777,551 A | 7/1998 | Hess | |
| 5,821,855 A | 10/1998 | Lewis | |
| 6,032,036 A | 2/2000 | Maystre et al. | |
| 6,094,140 A | 7/2000 | Parente | |
| 6,542,078 B2 | 4/2003 | Script et al. | |
| 6,833,788 B1 | 12/2004 | Smith et al. | |
| 6,850,601 B2 | 2/2005 | Jones, III et al. | |
| 6,965,313 B1 | 11/2005 | Saylor et al. | |
| 7,126,472 B2 | 10/2006 | Kraus et al. | |
| 7,180,415 B2 | 2/2007 | Bankert et al. | |
| 7,277,018 B2 | 10/2007 | Reyes et al. | |
| 7,554,439 B2 | 6/2009 | Mehaffey | |
| 7,936,263 B2 | 5/2011 | Mehaffey | |
| 2007/0296575 A1 | 12/2007 | Eisold et al. | |

*Primary Examiner* — John A Tweel, Jr.
(74) *Attorney, Agent, or Firm* — Troutman Sanders LLP; James E. Schutz; Robert R. Elliott, Jr.

(57) ABSTRACT

The present invention is directed toward systems and methods for providing a remote monitoring system with radio dispatch. In an exemplary embodiment, the present invention provides a central monitoring unit for receiving a first event signal from a first remote monitoring device, identifying the first remote monitoring device as the originator of the first event signal, accessing a first prerecorded dispatch message associated with the first event signal, and transmitting the first prerecorded dispatch message. The present invention may also include multiple remote monitoring units for detecting events at a plurality of remote monitoring locations. Upon detection, the remote monitoring units transmit an event signal to the central monitoring unit.

20 Claims, 3 Drawing Sheets

FIG. 3

REMOTE MONITOR SYSTEM WITH RADIO DISPATCH

CROSS-REFERENCE TO RELATED APPLICATION & PRIORITY CLAIM

This patent application claims priority under 35 U.S.C. §120 and is a continuation of U.S. Non-Provisional patent application Ser. No. 12/491,869, filed 25 Jun. 2009 (now U.S. Pat. No. 7,936,263), of the same title, which in turns claims the benefit under 35 U.S.C. §120 of U.S. patent application Ser. No. 11/546,211, filed 11 Oct. 2006 (now U.S. Pat. No. 7,554,439). Each of the above-listed applications is herein incorporated by reference as if fully set forth below in their entireties.

BACKGROUND OF THE INVENTION

1. Technical Field

The present invention relates generally to electronic monitoring systems and more particularly to a remote monitoring system for detecting an event condition and reporting such detection to a central system for transmission of a radio dispatch message.

2. Background of Related Art

Security guard forces have long been employed to patrol and protect property against unauthorized intrusion and vandalism. Such forces are common in large industrial complexes housing valuable equipment, inventory, or sensitive information. These complexes include, for example, store rooms, computer rooms, warehouses, manufacturing facilities, office buildings, military bases, department stores and the like. Prior to the introduction of portable two-way radios, such complexes would usually be patrolled by a team of guards with each guard periodically patrolling a designated area of the complex and returning to a central station to report. Obviously, this left most areas of the complex unattended for long periods of time between patrols.

With the introduction of portable two-way radios, each guard of a team could be stationed permanently in his designated area and could report in periodically to a central station via radio. He could also receive instructions via radio from the central dispatcher so that he could be advised quickly and efficiently of a change in his assignment or of an unusual or threatening situation. While such a system is an improvement over roving patrols, it is still subject to numerous inherent problems. The guards, for example, being human, are subject to inattention and can sometimes be evaded by a clever intruder. This is particularly true in situations where little or no activity over long periods of time can lead to extreme boredom and fatigue among the guards. Probably the most serious problem with posted human sentries is the extremely high cost in salaries and benefits of maintaining the necessarily large security force. Further, frequent turnover among security guards can lead to high training costs and reduced overall efficiency.

In recent years, electronic security systems have found widespread use as an adjunct to traditional radio dispatched security guard forces. Such systems can include passive infrared or heat sensors mounted in designated areas of a guarded complex and positioned to detect the presence of a person within the area. Upon such detection, the sensor, which is usually hard wired to a central control, signals the central control, which can emit a visual or audible signal indicating that an intruder has been detected.

Such security systems have allowed reduction in the number of persons required to guard a complex. Further, they are not subject to boredom, fatigue and evasion as human sentries can be. However, these motion detecting security systems are relatively simple, are not generally portable or easily adaptable to changing requirements, and convey no useful information in addition to a simple signal that a detection has been made. Accordingly, a guard responding to a detection must enter the monitored area with little or no information about where in the area the intruder was detected or how he may have been moving within the area.

The present inventor addressed these and other deficiencies in the art by providing an infrared sentry with voiced radio dispatched alarms, as described in U.S. Pat. No. 5,283,549. This device broadcasts radio dispatch messages when an alarm is detected. While the solution provided an excellent solution at the time, additional challenges must be addressed.

Over the past several years, police band radios have become significantly more complex and expensive. Thus, the security units, each of which includes a radio, have also become significantly more expensive. Therefore, many police departments are not able to buy the quantity of security units they desire due to budgetary constraints.

Additionally, numerous other industries desire to economically monitor buildings and equipment in remote locations. For example, an information technology support company tasked with maintaining server computers located at its customers' facilities, may desire notification if the server is moved or overheats. Therefore, it would be desirable to provide a system capable of monitoring such equipment and/or facilities and broadcasting an event message to personnel responsible for maintaining the equipment when necessary.

Accordingly, there is a need in the art for a low cost portable monitoring system. Additionally, there is a need in the art for a portable monitoring system that does not require a dispatch radio to be installed in each remote unit. Further, there is a need in the art for a monitoring system in which a single radio device can service multiple remote monitoring stations. Further, there is a need in the art for a monitoring system that can receive event messages from a variety of remote monitor devices and broadcast an event message.

SUMMARY OF THE INVENTION

The present invention is directed toward systems and methods for providing a remote monitoring system with radio dispatch. In an exemplary embodiment, the present invention provides multiple remote monitoring units for detecting events at a plurality of remote monitoring locations. Upon detection, an event signal is transmitted from the remote monitoring unit to a central monitoring unit. The central monitoring unit receives the event signal and broadcasts a radio dispatch message over a radio frequency.

In an exemplary embodiment, each remote monitoring unit is adapted to detect event conditions, such as alarms, intrusions, breakdowns, or the like. Upon detection, the remote monitoring unit places a call to the central monitoring unit. The central monitoring unit receives the call and determines the origin of the call. The central monitoring unit may determine the origin of the call using DNIS data, or other means for determining where a call originated.

When the central monitoring unit determines where the call originated, it accesses a prerecorded message associated with the remote monitoring device that detected the event condition and broadcasts the associated prerecorded message over a radio frequency. In an exemplary embodiment, the message is broadcast over a police-band radio.

DETAILED DESCRIPTION OF THE PREFERRED EMBODIMENT

Figure 1:
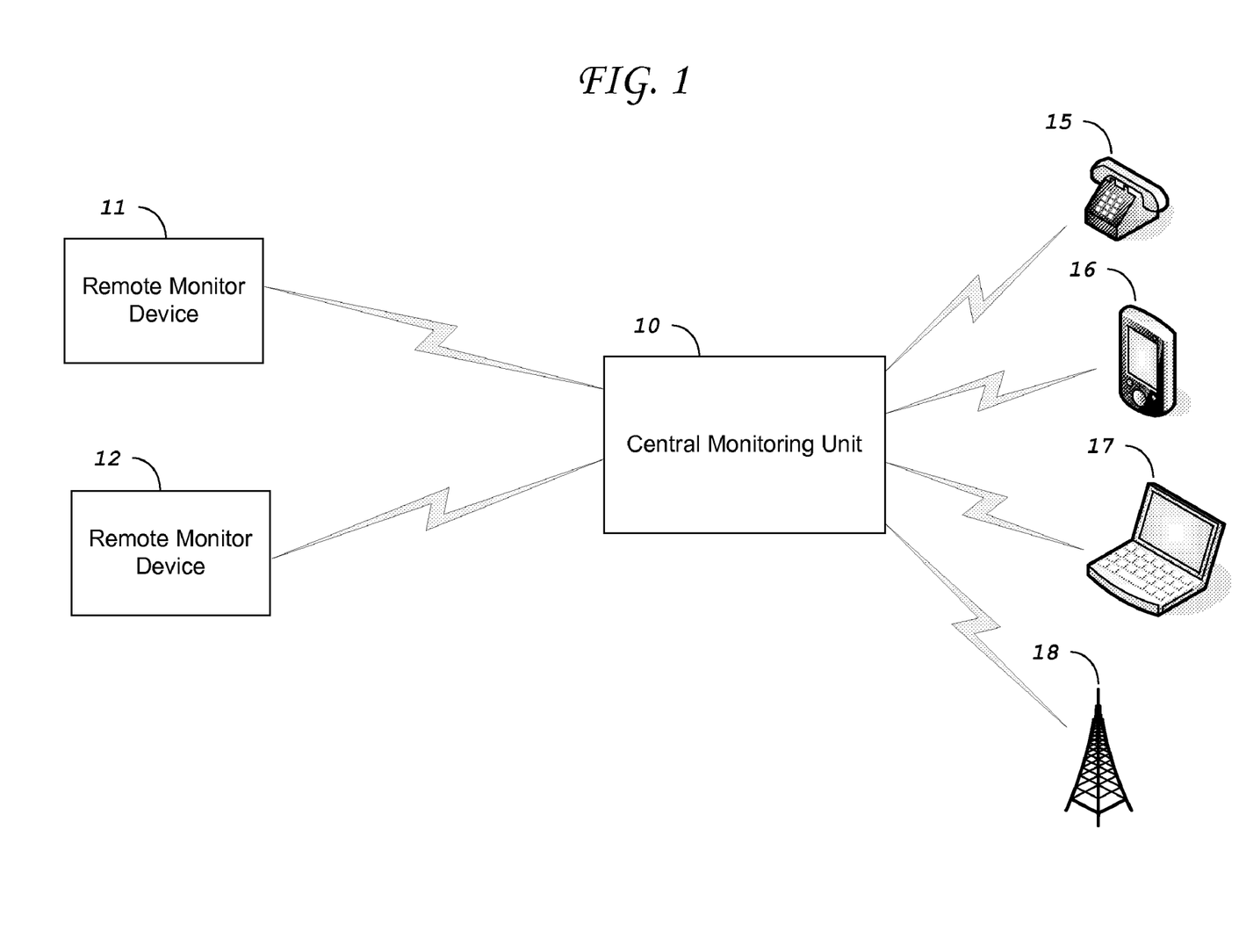
FIG. 1 is a block diagram illustrating an exemplary embodiment of the present invention.

Referring now in more detail to the drawings, in which like numerals refer to like parts throughout the several views, FIG. 1 is a block diagram illustrating an exemplary embodiment of the present invention. As illustrated in FIG. 1, the present invention may include multiple remote monitoring units 11, 12 for detecting events at a plurality of remote monitoring locations. Upon detection, an event signal is transmitted from the remote monitoring unit 11 to a central monitoring unit 10. The event signal may be transmitted over any available communication medium including, but not limited to, conventional telephone lines, a cellular communication structure, the internet, or radio communication systems. The central monitoring unit 10 receives the event signal and broadcasts a radio dispatch message over a radio frequency 18. Alternatively, the central monitoring unit 10 may transmit the dispatch message to a telephone 15, a PDA 16, a computer 17, or any other suitable device.

In an exemplary embodiment, each remote monitoring device 11 is adapted to detect event conditions, such as alarms, intrusions, breakdowns, or the like. Upon detection of an event, the remote monitoring device 11 then contacts the central monitoring unit 10.

The remote monitoring devices 11 may be implemented using a variety of devices. In operation, the remote monitoring device 11 may be implemented simply with a sensor and a dialer. For example, and not limitation, a simple sensor may include a panic button. In such an embodiment, the dialer would automatically dial the phone number of the central monitoring unit when an operator presses the panic button. Alternatively, simple sensors may include intrusion sensors, motion sensors, contact sensors, temperature sensors, infrared sensors, microware sensors, acoustic sensor, multi-technology sensors, and the like. Alternatively, the remote monitoring device may comprise significantly more features and may be adapted to detect a variety of events.

Upon detection of an event, the remote monitoring device 11 places a call to the central monitoring unit 10. The central monitoring unit 10 receives the call and determines the origin of the call. The central monitoring unit 10 may determine the origin of the call using DNIS data, or other means for determining call origination. In an alternative embodiment, the remote monitoring devices 11 may be configured to provide a device code to the central monitoring unit 10. In such an embodiment, the central monitoring unit 10 may use the device code to identify the event message originator.

During installation, each remote monitoring device 11 is associated with an installation location. The central monitoring unit 10 records this location so that it can identify the remote monitoring device 11 when it receives an event signal. For example, the remote monitoring device 11 may be associated with a telephone number so that the central monitoring unit 10 can recognize the remote monitoring device 11 when it receives a call from the telephone number associated with the remote monitoring device 11. Alternatively, during installation the remote monitoring device 11 may be associated with a device code instead of a telephone number.

Additionally, during installation, or any time thereafter, a dispatch message may be recorded and associated with the remote monitoring device 11. Preferably, the dispatch message provided information about the event, its location, and a desired response. For example, if the remote monitoring device were installed with a motion sensor at 123 Main Street, the recorded dispatch message might include the following language: "Security needed at 123 Main Street, please respond quickly." Alternatively, the event message may request fire assistance, maintenance assistance, or any other required attention. When the central monitoring unit 10 detects a call from the remote monitoring device 11, it broadcasts the associated prerecorded dispatch message. In a preferred embodiment, the message is broadcast over a radio frequency. In an exemplary embodiment of the present invention, the prerecorded messages are stored in a message database and the database is accessed when an event signal is received.

In an alternative embodiment of the present invention, the prerecorded dispatch message may be recorded in the form of text. In such an embodiment, the text message is converted to audio using a text to speech processor and is then broadcast over the radio frequency. In yet another alternative embodiment of the present invention, the remote monitoring device 11 may transmit a text message to the central monitoring unit 10. This text message may then be converted to audio using a text to speech processor and transmitted over the radio frequency.

In an exemplary embodiment of the present invention, the system may be programmed such that a dispatch message is only broadcast during certain hours. In such an embodiment, the system may determine that an event signal was received from a remote monitoring device 11 for which a dispatch message should only be broadcast during a predetermined time period. For example, it may be desirable to only broadcast the dispatch message at night or outside of normal business hours.

Figure 2:
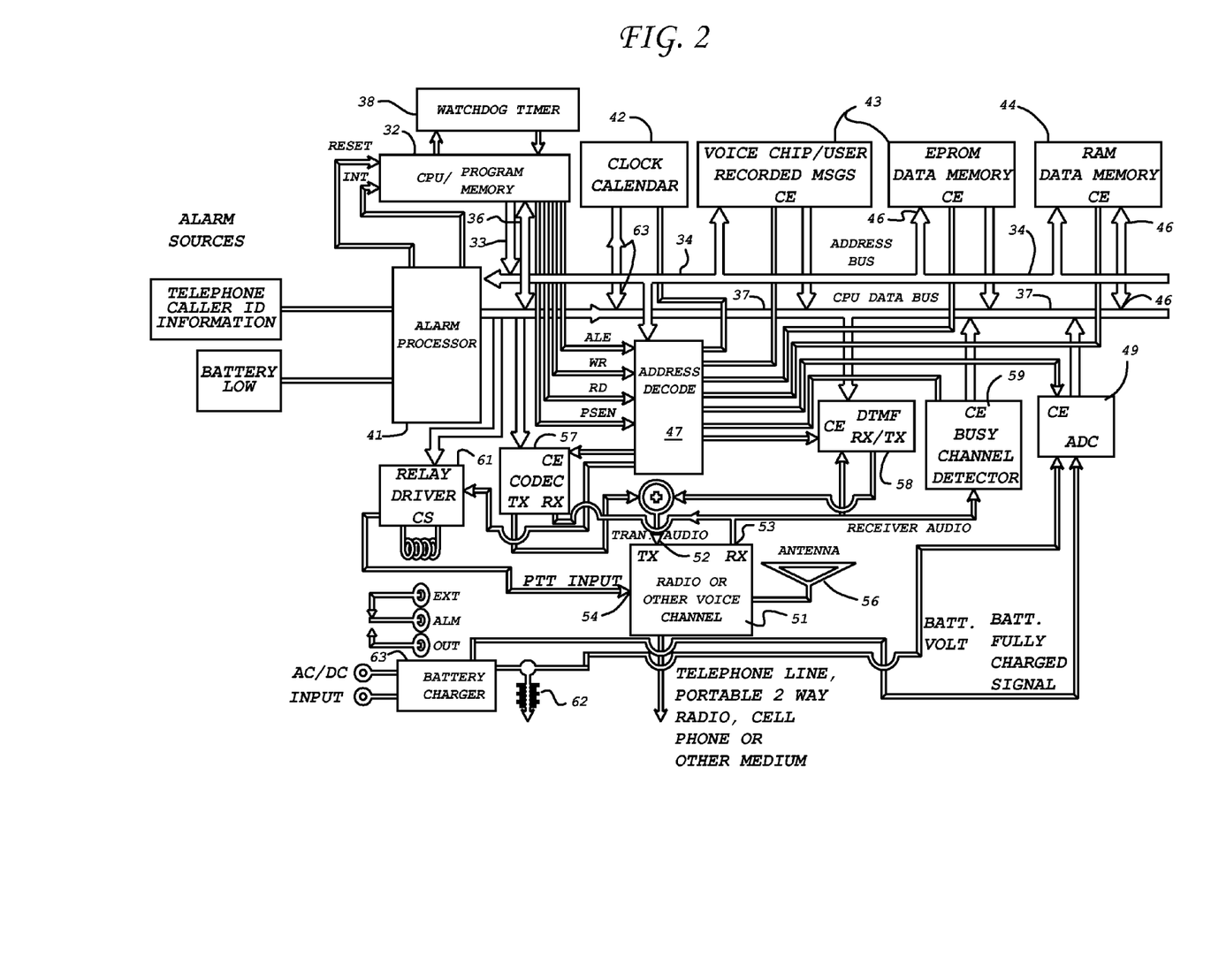
FIG. 2 is a schematic block diagram illustrating preferred interconnections of internal electronic components of the system to perform the method of the invention.

FIG. 2 is a schematic block diagram showing interconnections of exemplary electronic components of the present invention. Those skilled in the art will recognize that FIG. 2 shows an exemplary system diagram and that the present invention may operate using various system configurations. FIG. 2 is provided to illustrate an exemplary configuration; however, the present invention is not intended to be limited to the exact configuration illustrated.

Those of skill in the art will recognize that FIG. 2 illustrates an exemplary central monitoring unit 10. In various embodiments, the present invention may or may not include remote monitoring devices 11, but in general it receives event messages from such devices. Accordingly, third party or preexisting remote monitoring units 11 may be used in conjunction with the central monitoring unit 10 of the present invention. In general, any remote monitor device may be used that can send an event signal to the central monitoring unit 10.

The system preferably includes a central processing unit (CPU) 32. The CPU 32 functions as the brains of the system by receiving information from various peripherals and performing processing functions. While the CPU chip itself may be chosen from among any of a number of commercially available chips, it has been found that ARM Chip No. LPC2148 available from Philips functions exceptionally well in the circuit of this invention.

The CPU 32 is coupled through an address port 33 to the address bus 34 of the circuit and through a data port 36 to the data bus of 37 of the circuit. As will be well understood by persons of ordinary skill in this art, various peripheral circuitry such as a power source, a crystal clock oscillator, and the like, is also coupled to the CPU for normal operation thereof. Such peripheral circuitry has been omitted from FIG. 1 for clarity of understanding.

A watchdog timer 38 may be coupled to the CPU 32 and functions to monitor the status of the CPU 32 and its related hardware and to reset the CPU 32 in the event of an abnormal condition of the hardware. The function of the watchdog timer 38, therefore, is to oversee the condition of the CPU 32 and related chips and is a normal function of most CPU chips. In fact, in the Philips chip of the preferred embodiment, the watchdog timer is built into the CPU chip itself and functions transparently until an abnormal hardware or software condition occurs.

Also coupled to the CPU 32 through the address 34 and data 37 busses of the circuit is a clock/calendar 42 that maintains the current date and time of day and that can make this information available to the CPU 32 through the data bus 37 when desired.

A set of erasable programmable read-only memory (EPROM) chips 43 are coupled to the CPU 32 through its data and address busses. Alternatively, FLASH memory, or any other suitable memory source may be used in place of the EPROM chips 43. Accordingly, the present invention is not intended to be limited to EPROMs. Thus, while the present description refers to EPROM chips, those of ordinary skill in the art will recognize that the alternative memory devices fall within the scope of the invention. The memory provided by these EPROM chips 43 is used to store invariant information and data such as the software program that controls the various functions of the system and the digitized pre-programmed set of words and commands that can be accessed and broadcast over a radio transmitter.

The system may also include random access memory (RAM) 44, which may be used to store changing or intermittent data during operation of the CPU 32 and that also may be used to store user input data, such as custom digitized words or other commands input by the user of the system. As with the EPROM chips 43 and the clock/calendar 42, the RAM 44 is coupled to the CPU 32 through the address and data busses of the circuit. As illustrated by the direction indicators 46, the data flow between the data bus 37 and the RAM 44 may be in both directions such that information can be both written to and read from the RAM during operation of the CPU 32. This is also true of the clock/calendar 42. The data and information stored in the EPROM chips 43, however, typically only flow from the chips to the CPU 32.

An address decoder 47 may be coupled to the CPU 32, to the address bus 34, and to various peripheral devices such as the EPROMs 43, the clock/calendar 42, the RAM 44, and other chips. In an exemplary embodiment of the present invention, a programmable logic device, such as the XCR3256 available from Xilinx may be used as the address decoder 47. Upon receipt of a read or write instruction from the CPU 32, the address decoder 47 may determine from the address on the address bus 34 which of the peripheral devices corresponds to the address and activates the corresponding device accordingly. The CPU 32 might, for example, instruct the address decoder 47 that it would like to retrieve the data stored in a particular address assigned to the RAM chip 44. The address decoder 47 would then read the prescribed address from the address bus 34, decode the address to determine that it indeed resided in the RAM chip, and activate the RAM chip to output the contents of the specified address onto the data bus 37, where it can be used by the CPU 32 or by other peripheral devices coupled to the data bus 37.

An alarm processor 41 may be provided to receive event signal information from the remote monitoring devices 11, 12. In an exemplary embodiment of the present invention, the alarm processor 41 detects caller ID information and identifies which remote monitoring device 11, 12 sent the event signal. The caller ID information may include, but is not limited to, DNIS data, origination telephone number, origination name, origination company, or any other information associated with the origination telephone number or device. For example, if the caller ID information matches the telephone number for remote monitoring device 11, then the alarm processor 41 identifies that remote monitoring device 11 initiated the event signal. The alarm processor 41 then places an appropriate message on the data bus to instruct the system to broadcast a message from remote monitoring device 11 and it places an appropriate message on the address bus to access the recorded message associated with remote monitoring device 11. The recorded message is then directed from the voice chip 43 to the transmitter 51 for broadcast.

The transmitter 51 may be a two-way radio transceiver, such as the Vertex VX160 available from the Yaesu Corporation. Alternatively, many other transmitters may be used. Additionally, for greater compatibility, the present invention may be provided without a transmitter 51. In such an embodiment, it is preferable that cabling be provided so that a user may connect a third party transmitter to the system. The transmitter is preferably coupled to the CPU 32 and may be activated thereby to transmit verbal commands appropriate to a given alarm or other condition. The transmitter 51 is preferably provided with an input 52 for receiving information to be transmitted, an output 53 through which signals received from an external transmitter are available, a "push to talk" input 54 that, upon receipt of an appropriate signal, places the radio transceiver 51 in the transmit mode, and an antenna 56 over which radio frequency signals are received and transmitted.

The input 52 and output 53 of the radio transceiver 51 are coupled to the central processor data bus through a CODEC chip 57. The CODEC chip 57 performs dual functions in the circuit illustrated in FIG. 2. In one mode, previously digitized voice commands may be retrieved from memory by the central processor and made available to the CODEC chip 57 through the system data bus. The CODEC chip 57 then converts the digitized voice commands back to their analog equivalents. These analog signals are then presented to the input 52 of the transmitter 51 for broadcast thereby.

In the second mode of operation of the CODEC chip 57, voice commands that are received by the transceiver 51 from a remote transmitter can be conveyed through the transceiver output 53 to the CODEC chip 57. The CODEC chip 57 may then convert the analog signals to their digitized equivalents and make these digitized equivalents available to the central processor through the data bus 37. The central processor may then store such commands for later retrieval and use. This function of the system is useful for receiving user input words or commands to supplement or enhance the list of commands stored in the system EPROM 43.

In an exemplary embodiment of the present invention, the functionality of the CODEC chip 57 may be performed by the VOICE chip 43. A VOICE chip such as the commercially available Winbond ISD15000 may be used in such an embodiment.

The CPU 32 may also be coupled to the input 52 and output 53 of the transceiver 51 through a Dual Tone Multi-Frequency (DTMF) Keypad encoder/decoder such as Chip Model No. MT88L85 available from the Zarlink Corporation. The function of the DTMF 58 is similar to that of the CODEC chip 57 except that the DTMF 58 encodes and decodes standard touch-tone keypad signals rather than verbal commands. In this way, digital information keyed into a remote radio transmitter and received by the transceiver 51 can be digitized and presented to the central processor through the data bus 37. Likewise, predetermined digitized keypad data can be converted by the DTMF 58 to its analog tonal equivalent and transmitted over the transceiver 51 if desired. While DTMF type information is contemplated in the preferred embodiment, it will be understood that virtually any type of control signals, such as FSK signals, can be recorded and stored in EPROM or RAM for transmission by radio or other means. This capability is useful in the system for external programming of various functions of the system. For example, a security guard equipped with a two-way radio of the type having a digital keypad might transmit to the central processor a predetermined sequence of keyed characters representing a preprogrammed command. The central processor may then respond accordingly by, for example, announcing the time, temperature, alarm history, message playback, voicing zone schedules, or performing some other preselected function.

In exemplary embodiments of the present invention, the system may be programmed using a variety of programming methods. For example, and not limitation, the system may be programmed using computer software, an LCD menu via membrane, and/or DTMF codes received over a radio or a telephone. A computer or other device may connect to the system via USB port, serial port, Ethernet port, wireless port, or any other suitable connection mechanism in order to access and program the system.

A busy channel detector 59 is coupled to the output 53 of transceiver 51 and can be activated to inform the central processor through the data bus as to whether the radio channel is busy, i.e. whether signals are being received from remote radio transmitter sources. This function is useful to ensure against inadvertent transmission while the channel is being used by others. In this regard, a relay or solid state driver 61 may be coupled to the central processor 32 and can be activated thereby to select the transmit mode of the transmitter 51 by an appropriate signal at the push to talk input 54.

A battery 62 provides power for operating the system of this invention and, when low, can be recharged by means of an internal or external battery charger 63. The battery and battery charger are coupled to the central processor through the ADC 49. In this way, the central processor can check the status of the battery and perform appropriate functions such as announcing its voltage, announcing that a charge is needed, shutting down the system to preserve the battery, or similar actions.

The CODEC chip 57, DTMF 58, busy channel detector 59, and relay driver 61 can be selected by the central processor through the address decoder. The selected device can then read information made available by the central processor on the data bus or can place information on the data bus for receipt by the central processor.

The system of the present invention as illustrated in FIG. 2 is preferably programmed to place itself in a standby or quiescent mode when there are no activated alarms or other signals to be processed. This is done to preserve battery power and to extend the life of the internal battery to its maximum possible extent. In the quiescent mode of the system, most of the electronic devices such as the CPU 32, the memory chips 43, 44, the alarm processor 41, and the like, are placed in a standby mode in which they draw very little current. The system can then be instructed to "wake up", or activate, upon the occurrence of anyone of a number of predetermined conditions such as an event condition, the activation of a sensor, the detection of a low battery, or simply at predetermined time intervals for housekeeping purposes. The system is activated by means of either a reset or interrupt signal conveyed to the CPU 32.

In the preferred embodiment, the system may be instructed to "wake up" or activate upon the occurrence of five distinct conditions; namely, power on, power off, an event condition, the activation of an alarm sensor, to perform housekeeping functions, or at predetermined time intervals to check the clock and implement a user input schedule for the event conditions. The occurrence of any of these events may reset the central processor and cause it to perform a number of functions depending upon the nature of the event.

The preferred embodiment is also provided with complete remote control of the various alarm messages. Such control includes the capability to playback previously broadcast messages, to record through a remote radio transmitter a voice message to override a system default message, or to specify any sequence of prerecorded words/messages that should be broadcast in response to activation of any of the system events. All of these functions and more can be implemented remotely through commands entered into the keypad of a remote radio transmitter.

Figure 3:
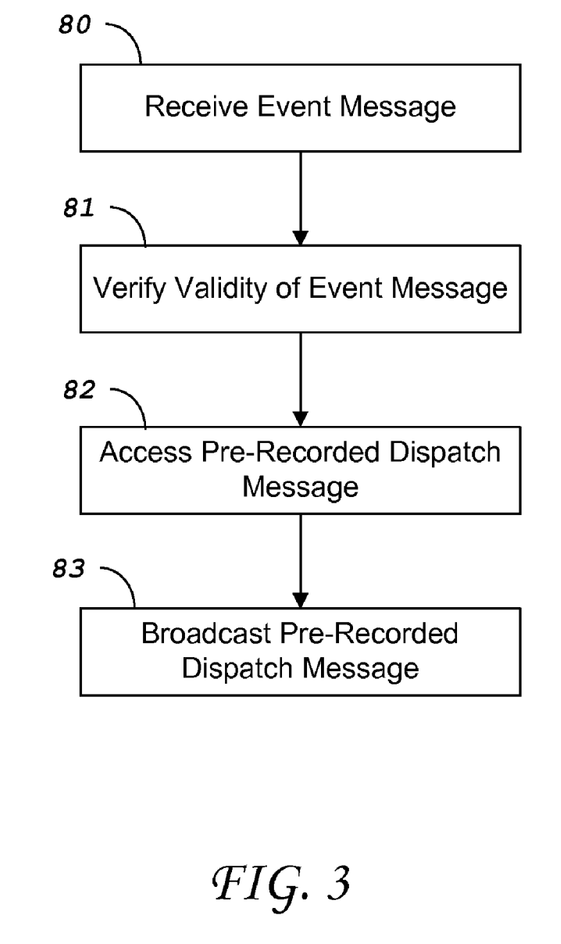
FIG. 3 is a flow diagram illustrating an exemplary method of receiving an event signal and broadcasting a dispatch message in accordance with an exemplary embodiment of the present invention.

FIG. 3 is a flow diagram illustrating an exemplary method of receiving an event signal and broadcasting a dispatch message in accordance with an exemplary embodiment of the present invention. As shown in FIG. 3, in an exemplary embodiment of the present invention, the central monitoring unit 10 may be adapted to receive an event message 80 from a remote monitoring device 11. As stated above, the event message may be in the form of a telephone call or other message sent to the central monitoring unit 10. In a preferred embodiment, the event message comprises a telephone call to the central monitoring unit 10.

Upon receipt of the event message, the central monitoring unit 10 may verify the validity of the event message 81. The validity of the event message may be verified by comparing the caller ID data received with a list of telephone numbers for installed remote monitoring devices. Alternatively, the event message may be verified by assuring that the event message was generated by an approved remote monitoring device 11 or that the event code is a recognized event code.

Once the event message has been validated, the central monitoring unit 10 may access a pre-recorded dispatch message 82. The dispatch message corresponds to the event message received and may contain information associated with the event and the location of the event. The pre-recorded dispatch message may then be broadcast 83. Preferably the dispatch message is broadcast over a two-way radio system. Alternatively, the dispatch message may be broadcast over any appropriate communication system in order to inform a desired recipient of the presence of the event.

In an alternative embodiment, the present invention may be configured such that multiple event messages may be associated with a single remote monitor device. In such an embodiment, the remote monitor device may transfer DTMF codes (touchtone codes) to the central monitoring unit to identify a particular event associated with the remote monitor device.

For example, and not limitation, a remote monitor device may be installed with sensors that detect three events: 1) a security breach, 2) a fire, and 3) a computer system error. Further, the system may be set up so that a security message is broadcast on a police band radio when the security breach is detected, a fire message is broadcast on a fire protection band radio when a fire is detected, and a computer support message is broadcast on a computer support radio system when a computer system error is detected. In operation, the remote monitoring device places a call to the central monitor unit when an event is detected. The central monitor unit may then determine the location of the event based on DNIS information. When the central monitor unit answers the call, it may then receive DTMF codes from the remote monitor device to determine the event that occurred. The central monitor unit may then access the appropriate dispatch message from a dispatch message database and broadcast the message on the appropriate communication system.

The system has been described herein in terms of a preferred embodiment. It will be obvious to those of ordinary skill in the art, however, that many variations might be made to the illustrated embodiment within the scope of the invention. For example, while the invention has been illustrated as broadcasting voiced commands over a two-way radio, it would be a simple matter to have the system dial a telephone number and broadcast the commands over telephone lines or other transmission means. The words "transmitter" and "transmission" as used herein should therefore be understood to refer to any means of transmitting verbal or coded messages to remote locations. In addition, a cellular telephone might be activated instead of the two-way radio of the preferred embodiment such that the system could make cellular phone calls and still be self-contained. Finally, while the preferred embodiment communicates with the outside world via spoken messages, it will be clear that other types of coded messages or information could be substituted for the spoken messages of the preferred embodiment with similar results. These and numerous other additions, deletions, and modifications might well be made to the preferred embodiment without departing from the spirit and scope of the invention as set forth in the claims.

I claim:

1. A method for broadcasting a dispatch message comprising:
    storing a first pre-recorded dispatch message associated with a first event signal in a central monitoring unit;
    receiving the first event signal from a first remote monitoring device at the central monitoring unit after storing the first pre-recorded dispatch message;
    identifying the first remote monitoring device as the originator of the first event signal;
    accessing the first prerecorded dispatch message; and
    transmitting the first prerecorded dispatch message over a communication medium using a transmitter in the central monitoring unit.

2. The method of claim 1, further comprising the steps of:
    storing a second pre-recorded dispatch message associated with a second event signal in the central monitoring unit;
    receiving the second event signal from a second remote monitoring device at the central monitoring unit;
    identifying the second remote monitoring device as the originator of the second event signal;
    accessing the second prerecorded dispatch message; and
    transmitting the second prerecorded dispatch message over a communication medium using the transmitter in the central monitoring unit.

3. The method of claim 2, wherein the first event signal is associated with a first event condition and the second event signal is associated with a second event condition.

4. The method of claim 3, wherein the event conditions are triggered by one or more sensors in communication with the first and second remote monitoring devices.

5. The monitoring system of claim 4, wherein the first and second event signals comprise information regarding which of the one or more sensors has triggered the event condition.

6. The method of claim 4, wherein at least one of the one or more sensors in communication with the first and second remote monitoring devices is a motion detector.

7. The method of claim 4, wherein at least one of the one or more sensors in communication with the first and second remote monitoring devices is a smoke detector.

8. A method for broadcasting a dispatch message comprising:
    storing, in a central monitoring unit, one or more pre-recorded dispatch messages associated with one or more event signals and one or more remote monitoring devices;
    receiving, at the central monitoring unit, a first event signal associated with a first event and a first remote monitoring device;
    identifying the first remote monitoring device as the originator of the first event signal;
    accessing a first prerecorded dispatch message from the one or more pre-recorded dispatch messages that is associated with the first event signal; and
    transmitting the first prerecorded dispatch message over a communication medium using a transmitter in the central monitoring unit;
    wherein, after storing the one or more pre-recorded dispatch messages in the central monitoring unit, the central monitoring unit and the first remote monitoring device operate autonomously.

9. The method of claim 8, wherein the transmitter transmits the first prerecorded dispatch message via a telephone.

10. The method of claim 8,
    wherein the first remote monitoring device comprised a motion sensor;
    wherein triggering the motion sensor generates the first event signal;
    wherein the first prerecorded dispatch message indicates a break-in at the address where the first remote monitoring device is located.

11. The method of claim 10, wherein the first pre-recorded message is transmitted directly over a police band radio.

12. The method of claim 8,
    wherein the first remote monitoring device comprises one or more of a heat detector and a smoke detector;
    wherein triggering one or more of the heat detector and the smoke detector generates the first event signal;
    wherein the first prerecorded dispatch message indicates a fire at the address where the first remote monitoring device is located.

13. The method of claim 12, wherein the first pre-recorded message is transmitted directly over a fire protection band radio.

14. The method of claim 8, further comprising:
    receiving, at the central monitoring unit, a second event signal associated with a second event and the first remote monitoring device;
    identifying the first remote monitoring device as the originator of the second event signal;

accessing a second prerecorded dispatch message from the one or more pre-recorded dispatch messages that is associated with the second event signal; and transmitting the second prerecorded dispatch message using the transmitter in the central monitoring unit.

15. The method of claim 8, further comprising:

receiving, at the central monitoring unit, a third event signal associated with a third event and a second remote monitoring device;

identifying the second remote monitoring device as the originator of the third event signal;

accessing a third prerecorded dispatch message from the one or more pre-recorded dispatch messages that is associated with the third event signal; and transmitting the third prerecorded dispatch message using the transmitter in the central monitoring unit.

16. A method for securing a location comprising:

installing a first remote monitoring device at the location;

storing, in a central monitoring unit, a first pre-recorded dispatch message associated with a first event signal and the first remote monitoring device;

receiving, at the central monitoring unit, the first event signal associated with a first event;

identifying the first remote monitoring device as the originator of the first event signal;

determining whether the first event signal has been received during a pre-determined time period;

transmitting the first prerecorded dispatch message using a transmitter in the central monitoring unit only if the first event signal is received during the pre-determined time period.

17. The method of claim 16, where the pre-determined time period comprises non-business hours for the location.

18. The method of claim 16, further comprising:

storing, in the central monitoring unit, a plurality of pre-recorded dispatch messages associated with a plurality of event signals and the first remote monitoring device;

accessing a first prerecorded dispatch message from the plurality of pre-recorded dispatch messages that is associated with the first event signal.

19. The method of claim 18, further comprising:

receiving, at the central monitoring unit, a second event signal associated with a second event and the first remote monitoring device;

identifying the first remote monitoring device as the originator of the second event signal;

determining whether the second event signal has been received during a pre-determined time period;

accessing a second prerecorded dispatch message that is associated with the second event signal and the first remote monitoring device from the plurality of pre-recorded dispatch messages;

transmitting the second prerecorded dispatch message using the transmitter in the central monitoring unit only if the second event signal is received during the pre-determined time period.

20. The method of claim 16, further comprising:

placing the first remote monitoring device in a standby mode outside the pre-determined time period.

* * * * *

UNITED STATES PATENT AND TRADEMARK OFFICE
CERTIFICATE OF CORRECTION

| | | |
|---|---|---|
| PATENT NO. | : 8,144,009 B2 | Page 1 of 1 |
| APPLICATION NO. | : 13/086264 | |
| DATED | : March 27, 2012 | |
| INVENTOR(S) | : Joseph Sutton Mehaffey | |

It is certified that error appears in the above-identified patent and that said Letters Patent is hereby corrected as shown below:

Title Page, item (63), should read;

This patent application claims priority under 35 U.S.C. § 120 and is a continuation of U.S. Non-Provisional Patent Application Serial No. 12/491,869, filed 25 June 2009, of the same title and currently pending, which in turns claims the benefit under 35 U.S.C. § 120 is a continuation of U.S. Patent Application Serial No. 11/546,211, filed 11 October 2006 (now U.S. Patent No. 7,554,439). Each of the above-listed applications is herein incorporated by reference as if fully set forth below in their entireties.

Signed and Sealed this
Eleventh Day of September, 2012

David J. Kappos
*Director of the United States Patent and Trademark Office*